UNITED STATES PATENT OFFICE.

LOUIS PRENZLAU, OF HAMBURG, GERMANY.

METHOD OF PRESERVING PERISHABLE GOODS.

1,045,178. Specification of Letters Patent. Patented Nov. 26, 1912.

No Drawing. Application filed July 11, 1910. Serial No. 571,384.

*To all whom it may concern:*

Be it known that I, LOUIS PRENZLAU, a subject of the German Emperor, and resident of Hamburg, Germany, have invented a certain new and useful Improvement in Methods of Preserving Perishable Goods, of which the following is a specification.

In methods hitherto employed for preserving eggs a number of disadvantages have been present. These consisted mainly in the comparatively complicated apparatus employed and in the time occupied. In addition known methods are not satisfactory when the eggs are to be kept for several months in warm climates. Methods for preserving eggs are known for instance in which the latter are subjected to the impregnating action of acid vapors under high temperature or pressure or even in a vacuum. Complicated and special apparatus are required and a considerable time occupied and in addition, the eggs require to be removed from the apparatus at the conclusion of the process and packed ready for transport, this operation resulting in the breakage of many of the eggs. Known methods also in which the eggs are dipped in a preserving material or inserted in packing material impregnated with substances containing carbonic acid are of little use when the eggs reach very warm climates. It has now been discovered that the vapors of formaldehyde which are very useful for preserving meat and other perishable food stuffs, the vapors being forced under pressure into the pores of the meat, are capable of use also for preserving eggs so that eggs subjected to formaldehyde vapor may be kept for any length of time and even after being kept for a long time in tropical zones are still palatable. Owing to the great sensitiveness of eggs to pressure however, it has hitherto been impossible to employ without modification this method of preserving eggs as the shells would collapse when the formaldehyde vapors were forced into the same. Therefore the eggs require to be subjected to a slight but sufficiently intensive action of the formaldehyde vapors.

According to the present invention the packing material which is formed from excelsior, shavings or the like is saturated with formaldehyde in the form of a solution, and the infusorial earth, peat asbestos or the like used as a filling material is also subjected to the action of the formaldehyde, so that eggs packed in this manner while being packed and during transport are subjected to the formaldehyde vapors exuding from the packing materials.

The *modus operandi* is as follows:—In the packing case for the eggs which is of the usual type is inserted the excelsior or the like, which has been previously saturated with formaldehyde. A layer of eggs is next inserted. While the eggs are being inserted the vapor from the formaldehyde enters the pores in the shells and destroys any bacteria therein. The eggs are not injured as this formaldehyde is used only in a solution of from 30 to 50%. The filling material now spread on the eggs forms an outer protecting cover also saturated with formaldehyde, preventing the entrance of germs from the atmosphere and preventing the eggs from decomposing. The formaldehyde vapors deposit on the walls of the packing case, crystallize there and thus fill the pores of the wood so that formaldehyde cannot escape to a great extent from the case. In this manner eggs may be preserved in tropical climates for a period of two months or more and will remain perfectly fresh. The eggs preserved in this way do not crack, the albumen does not separate from the yolk and the appearance and flavor are not affected as in previously known methods.

Having now described my invention what I claim and desire to secure by Letters Patent of the United States is:—

A method of preserving eggs by packing them in cases, said method consisting in placing the eggs in the case in a packing of excelsior saturated with formaldehyde, shutting off the atmosphere from the egg by filling the pores of the shell with vapors from the formaldehyde, and depositing crystals of said vapor in the pores of the case.

In testimony whereof I have signed my name to this specification in the presence of two subscribing witnesses.

LOUIS PRENZLAU.

Witnesses:
 GUSTAV WEBER,
 ERNEST H. L. MUMMENHOFF.